Figure 1:
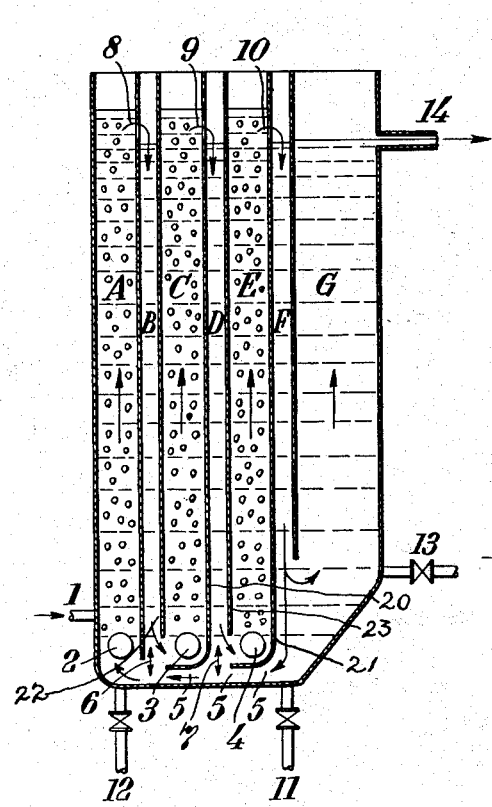

Patented Jan. 23, 1940

UNITED STATES PATENT OFFICE 2,188,192

METHOD OF AND APPARATUS FOR FERMENTING SOLUTIONS

Heinrich Scholler and Max Seidel, Solln, near Munich, Germany

Application April 27, 1937, Serial No. 139,152
In Germany May 4, 1936

11 Claims. (Cl. 195—78)

This invention relates to a process of and apparatus for the continuous fermentation of solutions, both for obtaining products of fermentation and for the cultivation of multiplying micro-organisms.

The present invention contemplates causing a fermentation liquid containing micro-organisms suspended therein by artificial means, as, for example, by stirring with mechanical means or with air or with other gases or by the high velocity of the fermentation liquid, to continuously and alternately ascend and descend, maintaining the micro-organisms in suspension in the fermentation liquid until the latter is fermented extensively or to the desired degree, so that artificial means for maintaining the micro-organisms in suspension are no longer employed in the final part of the path followed by the consumed fermentation liquid, and feeding at least a portion of the micro-organisms which have settled or have been eliminated, due to the suppression of the means of suspension, from the consumed fermentation liquid together with a part of the consumed fermentation liquid, to the place where the fresh fermentation liquid enters, and continuously removing the remaining part of the consumed fermentation liquid with a reduced content of micro-organisms.

The process according to the invention is continuous in the sense that fresh fermentation liquid or nutrient solution is continuously supplied and fermented liquid or consumed nutrient solution is correspondingly removed.

In order to clearly explain the invention, that embodiment relating to the cultivation of micro-organisms such as yeast is hereafter described. However, it is to be understood that the invention is not restricted thereto since, with the appropriate modifications, the invention also applies to the production of products of fermentation, such as alcohol, lactic acid, acetone, acetic acid, glycerine, butyl alcohol and other products obtained by means of micro-organisms.

In accordance with one embodiment of this invention, in order to realize an extensive utilization of the supplied nutrients, the nutrient solution is guided, until it is consumed, in such a manner that at no point in the path of travel thereof can fresh or less completely consumed nutrient solution mix with it. However, if desired, an admixture of more completely consumed nutrient solution may be effected at any point in the path of travel of the nutrient solution until the nutrients contained therein are consumed, without any harmful effect. An admixture of solution having a higher nutrient content than the solution circulating at the point of admixture would unnecessarily lengthen the path required for an extensive consumption of all the nutrients.

The consumption of the nutrients contained in the supplied nutrient solution may be accelerated by the employment of great quantities of micro-organisms. However, these large quantities of micro-organisms must be kept in suspension by special means, for example by stirring apparatus, aeration or a high flowing speed of the nutrient solution, so as to give the nutrients access to all the cells and so as to make it possible to remove quickly products of metabolism and products of fermentation.

In the present new continuous fermentation process, the special expedients employed for maintaining the suspension of the micro-organisms are eliminated or not used after the extensive consumption of the nutrient substances and before the solution leaves the fermentation vessel. This has the result that the smaller content of micro-organisms in the consumed solution that is running off or is withdrawn, which smaller content is due to the consumption of the nutrients, is still further reduced as compared with the content of micro-organisms in the unconsumed solution. Especially in the cultivation of micro-organisms, such as yeast, lactic acid bacteria and others, the quantity of micro-organisms drawn off with the consumed nutrient solution may be so slight, according to the nutrient concentration and the construction of the fermentation apparatus, as to correspond approximately to the increase. In such cases the stock of micro-organisms in the fermentation vessel requires no or only slight replenishment by the seed of fresh micro-organisms. In contradistinction to this, a supply of fresh micro-organism seed to replace the micro-organisms that are withdrawn may be used in processes for the production of fermentation products in which it is attempted as a rule to suppress extensively the propagation of the micro-organisms.

The nutrient solution, in which the micro-organisms contained therein are maintained in suspension, is guided by stirring with mechanical means or with air or with other gases or by high velocity or other known means until the nutrient solution is consumed, and in such a way as to prevent fresh or less consumed nutrient solution from mixing with this running nutrient solution at any point in its path of travel. The means employed to suspend the micro-organisms may be employed simultaneously for the positive progression of the nutrient solution in its path of travel. In special cases where because of the kind or the amount of the micro-organisms used special means are not required to maintain the micro-organisms in suspension, it is sufficient that the progression of the nutrient solution in the path destined for it is effected by any kind of mechanical means, such as pumps, injectors, etc., or also by blowing in air or gases where this is not disadvantageous for the micro-organisms used or the nutrients or products.

The nutrients that are present are extensively consumed in the path of travel of the nutrient solution. Before discharging the consumed nutrient solution from the fermentation vessel in the final portion of the path of travel of the nutrient solution, the means employed for maintaining the micro-organisms in suspension are omitted or shut off. Part of the micro-organisms separate because of the reduced vitality due to the lack of nutrients and due to the lack of means for artificial suspension, from the consumed solution, and part of the consumed nutrient solution leaves the fermentation vessel with a reduced content of micro-organisms.

The micro-organisms eliminated from the suspension are conveyed with the other portion of the consumed nutrient solution to the point where the fresh nutrient solution enters, without leaving the fermentation vessel, and mixing with the fresh nutrient solution they are again placed in suspension. Consuming the nutrient substances, the returned micro-organisms repeat the path they have passed before.

Figure 2:
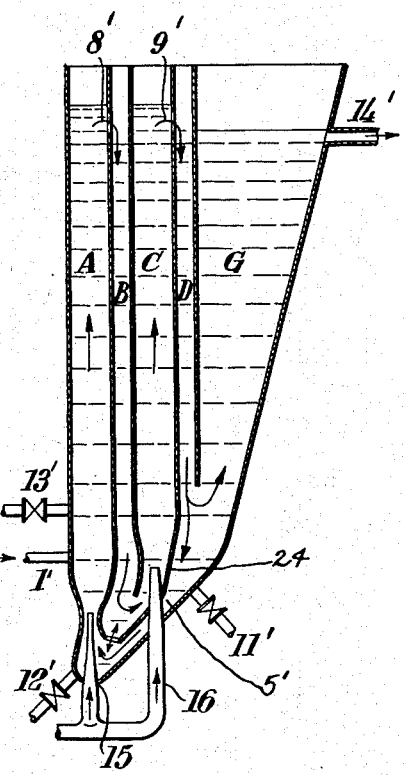
Figure 3:
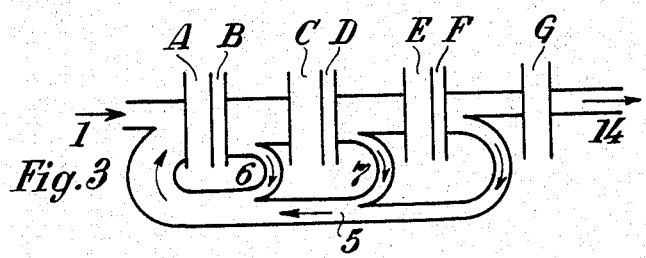
Figure 4:
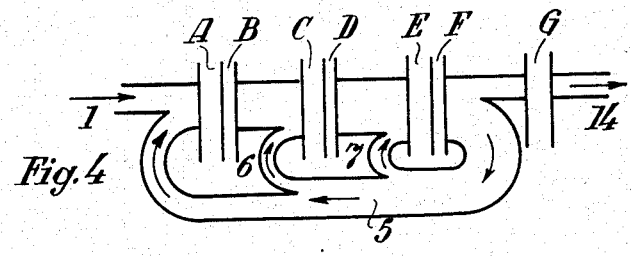
Figure 5:
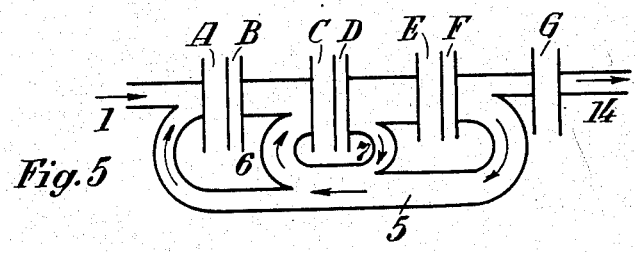
Figure 6:
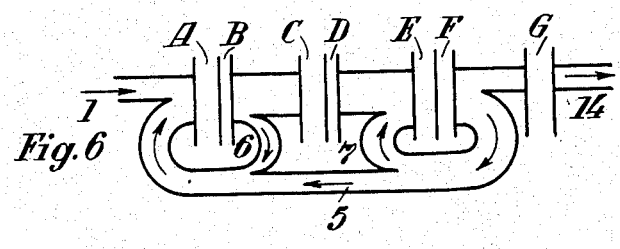

In order to more fully explain the invention, reference is directed to the drawings accompanying this specification and wherein:

Figure 1 diagrammatically illustrates in section an apparatus having a multiple circulatory system which is suitable for carrying out the new process;

Figure 2 shows a similar apparatus with certain variations, also diagrammatically in section; and Figures 3, 4, 5 and 6 are illustrations representing diagrammatically, and without relation to the scale, examples of the various flowing conditions in the apparatus shown in Figure 1.

For the purpose of maintaining the suspension of the micro-organisms in the nutrient and at the same time conveying the nutrient solution along the determined path, the apparatus shown in Figure 1 is provided with well-known arrangements 2, 3 and 4 for aerating or agitating the solution with gases (circulating carbonic acid, indifferent gases and others).

The fresh nutrient solution is supplied continuously through the inlet 1 and forced upward in the ascending chamber A by the air or gas bubbles ascending from the aerating arrangement 2. After a portion of the nutrients has been consumed in the ascension chamber A, the liquid descends in the descension chamber B. The nutrient solution in the ascension chamber C is again forced upward by the bubbles ascending from the aerating arrangement 3. In chambers B and C additional nutrient substances are consumed. The nutrient substances still present are extensively consumed when the nutrient solution descends in the descension chamber D and is forced up again in the ascension chamber E by the bubbles ascending from the aerating arrangement 4.

From the descension chamber F the consumed nutrient solution with the micro-organisms suspended therein reaches the separation chamber G, which is not provided with any arrangement for maintaining the micro-organisms in suspension. Here a portion of the micro-organisms settles or is deposited and sinks to the bottom. The micro-organisms desposited from the suspension are returned to the ascension chamber A through the canal 5, if required with the aid of mechanical means, together with a portion of the consumed nutrient solution, and here mix with the fresh nutrient solution entering at 1.

It is to be noted that the walls 20 and 21 are curved rearwardly and made to extend below the aerating devices 3 and 4, respectively, and terminate substantially opposite and spaced from walls 22 and 23, respectively.

The openings 6 and 7 at the lower ends of the chamber B and chamber D either admit more completely consumed nutrient solution to the chambers B or D than are present in the chambers, or they permit partly consumed nutrient solution to leave the chambers B or D in order to pass it over into chambers where the nutrient solution has been consumed less extensively. Whether liquid enters or leaves by the openings 6 and 7 and the amounts of the liquid passing over will depend on the intensity of the rising movement in the individual ascension chambers A, C and E. The direction of flow obtaining in canal 5 from the settling chamber G, under the ascending chambers E and C, along to the ascending chamber A, leads the amount of liquid passing from one chamber to another chamber always positively into those chambers where the nutrients have been less extensively consumed.

The openings 6 and 7 also prevent the formation of dead spaces at the lower return points of the flow between the chambers B and C and between the chambers D and E, in which dead spaces there would be no circulation of the liquid and which, therefore, might readily become foci of infection or at least depositing places for micro-organisms, salts and sinking substances of every kind. The compensating streams arising in the openings 6 and 7 in the case of irregular ascension in the different ascension chambers A, C and E always wash away again all the sinking substances that have a tendency to collect at the lower ends of the chambers.

The openings 6 and 7 also make it possible to clean the chambers B, C, D and E readily.

The speed of circulation of the nutrient solution through the different systems of double chambers (multiple circulatory system) A + B, C + D and E + F may be regulated not only by the intensity of the aeration or the ascending motion produced by the stirring apparatus or other means, but also by the size of the passage openings 8, 9 and 10 at the upper return points of the flow. These openings 8, 9 and 10 may be either fixed or adjustable in cross-section.

The openings 8, 9 and 10 are expediently of such cross-sections that the speed at which the nutrient solution flows through the chamber system is limited to a certain amount so that, after passing through a system of chambers, a good consumption of the nutrients that are present occurs even when operations are carried on with strong aeration or vigorous agitation for the purpose of producing a satisfactory suspension of the micro-organisms.

The openings 11 and 12 may be closed, or one of the openings may be utilized to remove periodically or continuously a portion of the sediments consisting of micro-organisms and, according to the kind and treatment of the wort, of sinking substances.

At 13, or at any other point of the fermentation vessel, fresh micro-organisms may be introduced as seed periodically or continuously for the purpose of replenishing or refreshing the stock of micro-organisms.

In the last chamber G (herein called the settling chamber) which is not provided with arrangements for maintaining the micro-organisms in suspension, the part of the consumed nutrient solution not returned with the separated micro-organisms in the canal 5 rises and is continuously removed at 14 in an amount approximately equal to the quantity of nutrient solution supplied at 1. The micro-organisms still present in the consumed nutrient solution leaving at 14 may be obtained by removal by means of centrifuging or settling or precipitation by means of adding bases suitably in the presence of phosphates. The precipitation of micro-organisms in the settling chamber G, that is to say within the fermentation vessel, may be promoted by similar means, as by the reduction of the hydrogen ion concentration, e. g. by the addition of alkali or by the addition of phosphates, so that the consumed nutrient solution leaving at 14 contains only few micro-organisms.

The fermentation apparatus may be operated also under conditions promoting the settling of the micro-organisms per se, for example, with a suitable concentration of hydrogen ions, the use of micro-organisms especially tending to form flocks or other conditions that are known to promote settling.

The micro-organisms obtained from the consumed nutrient solution which is flowing off may be returned again to the fermentation vessel, if required. This is done especially in cases where only products of fermentation are to be obtained, but no micro-organisms.

In cultivating micro-organisms, the micro-organisms to be obtained may, therefore, be separated either from the fermented nutrient solution or from the sediment that is removed.

The aerating arrangements 2, 3, 4 may be replaced by mechanical stirring apparatus, or the ascending movement of the nutrient solution in the chambers A, C and E may be effected by means of pumps or injectors, in which case the maintenance of the suspension of the micro-organisms may be promoted by means of a high velocity of flow. In such an embodiment it is sufficient if the high velocity of flow is produced at the lower end of the ascending chambers A, C and E by means of suitable reduction of cross-section. The acceleration of the ascending movement of the nutrient solution may be produced by the same means as in other cases, e. g. aeration, stirring apparatus, pumps, injectors, etc.

Referring now to Figure 2 wherein another embodiment of the invention is illustrated, this embodiment is provided with only two double chamber systems A'+B', and C'+D', in combination with the final ascension chamber G'. Injectors 15 and 16 actuated with gases or liquids, for example, spent nutrient solutions, are employed to effect the ascension and conveyance of the nutrient solutions. It is to be noted that the ascension chambers A' and C' adjacent the injectors 15 and 16 have reduced cross-sections. It is further to be noted that the wall 24 extends rearwardly and in a direction parallel to the inclined bottom of the vessel. The lower end of the wall 24 terminates approximately in the center of the descension chamber B'. The wall 24 cooperating with the bottom of the vessel forms a canal 5' which is inclined as shown, so as to promote travel of the micro-organisms deposited in the chamber G' or spent nutrient solution to the ascension chamber A'. In this embodiment, the direction of flow in the canal 5' is the same or may be made the same as that obtaining in the canal 5 of Figure 1. The speed of circulation of the nutrient solution through this system may be regulated not only by the injectors but also by the size of the passage openings 8' and 9', which are similar in design and construction as passage openings 8 and 9 of Figure 1. The elements designated by the reference numerals 1', 11', 12', 13' and 14' are similar to and function in the same manner as the elements 1, 11, 12, 13, and 14 of Figure 1.

Though in the embodiments described, two and three double chamber systems are illustrated, it is to be understood that the invention is not restricted thereto.

In place of the three double chamber systems A+B, C+D and E+F shown in Figure 1, a greater number of such double chamber systems may be made use of with fermentations or cultivation processes proceeding difficultly or slowly. Where the fermentation or the conversion of the nutrient substances proceeds rapidly, it is sufficient to use only one or two double chamber systems instead of three.

By utilizing passage openings 8, 9 and 10 of appropriate dimensions and cross-section and selected intensities of aeration, etc., various conditions of flow through the apparatus may be obtained. Figures 3, 4, 5 and 6 illustrate, or the apparatus represented in Figure 1, various possibilities of guiding and sub-dividing the flow of the liquid within the apparatus. The chambers and canals are referred to by the same letters and numerals used in Figure 1. It is to be noted that in each instance, nutrient solution is returned through the canal 5 to the first ascension chamber A. If desired, a part of the spent nutrient solution may be made to admix with less spent nutrient solution and be caused to circulate through the system or be conducted to the chamber A or supply inlet 1.

By using micro-organisms of any desired concentration, processes that go on very slowly may be carried out with the new process in a comparatively short time.

The immediately produced dilution of the supplied fresh liquid of fermentation or nutrient solution with any desired amount of fermented or spent solution is advantageous in different directions. The nutrient content of the wort or the product to be fermented is subjected to a dilution that promotes fermentation or the growth of the micro-organisms without dilution of the fermented wort or a reduction of the concentration of the products of fermentation in the final result. The protective action of the product of fermentation, e. g. of the alcohol produced, against foreign micro-organisms is effective from the very beginning of the process.

The new process is also suitable for carrying out processes of fermentation and processes of propagation of micro-organisms in absolutely pure culture if the wort supplied is sterilized and any gases of ventilation that are used are sterilized. The fermentation vessel may be easily sealed tightly on all sides so that no germs can enter. As to the discharged spent liquid and any ventilating gases or waste gases of fermentation, a suitable arrangement of the outlets and other suitable means, e. g. passing the gases through sterile liquid seals, high escaping velocity of gases or liquids, may prevent germs from entering the fermentation vessel.

In the claims the expression "to suspend", or equivalent thereof, is intended to cover producing the suspension or, if the suspension has already been formed, to maintain the suspension.

Since it is obvious that various changes and modifications may be made in the above description without departing from the nature or spirit thereof, this invention is not restricted thereto except as set forth in the appended claims.

We claim:

1. An apparatus for the continuous fermentation of liquids comprising a vessel provided with a plurality of chambers constituting ascension chambers through which fermentation liquid travels in an ascending path and a plurality of chambers alternately disposed between said ascension chambers constituting descension chambers through which fermentation liquid travels in a descending path, means connecting said ascension and descension chambers to provide a multiple circulatory system so that the liquid will travel alternately in an ascending and descending path to permit uninterrupted progressive consumption of the nutrient substance, said vessel being also provided with a settling chamber through which the liquid travels in an ascending path, means to supply fermentation liquid containing micro-organisms to the first ascension chamber, means cooperating with each of said ascension chambers to suspend the micro-organisms in said fermentation liquid, means in the lower portion of the vessel connecting the last descension chamber and settling chamber with the first ascension chamber whereby a part of the micro-organisms is automatically returned to the first ascension chamber, and means to withdraw consumed nutrient solution from said settling chamber.

2. An apparatus for the continuous fermentation of liquids comprising a vessel provided with a plurality of chambers constituting ascension chambers through which fermentation liquid travels in an ascending path and a plurality of chambers alternately disposed between said ascension chambers constituting descension chambers through which fermentation liquid travels in a descending path, means connecting said ascension and descension chambers to provide a multiple circulatory system so that the liquid will travel alternately in an ascending and descending path to permit uninterrupted progressive consumption of the nutrient substance, said vessel also being provided with a settling chamber through which the liquid travels in an ascending path, means to supply fermenation liquid containing micro-organisms to the first ascension chamber, means cooperating with each of said ascension chambers to suspend the micro-organisms in said fermentation liquid and simultaneously aid in conveying the liquid through said ascension and descension chambers, means in the lower portion of the vessel connecting the last descension chamber and settling chamber with the first ascension chamber whereby a part of the micro-organisms is automatically returned to the first ascension chamber, and means to withdraw consumer nutrient solution from said settling chamber.

3. An apparatus for the continuous fermentation of liquids comprising a vessel provided with a plurality of chambers constituting ascension chambers through which fermentation liquid travels in an ascending path and a plurality of chambers alternately disposed between said ascension chambers constituting descension chambers through which fermentation liquid travels in a descending path, means connecting said ascension and descension chambers at the top and bottom thereof to provide a multiple circulatory system so that the liquid will travel alternately in an ascending and descending path to permit uninterrupted progressive consumption of the nutrient substance, the means connecting the ascension and descension chambers at the top thereof being of appropriate cross-section to regulate the flow of the liquid, said vessel being provided with a settling chamber through which the liquid travels in an ascending path, means to supply fermentation liquid containing micro-organisms to the first ascension chamber, means cooperating with each of said ascension chambers to suspend the micro-organisms in said fermentation liquid, means in the lower portion of the vessel connecting the last descension chamber and settling chamber with the first ascension chamber whereby a part of the micro-organisms is automatically returned to the first ascension chamber, and means to withdraw consumed nutrient solution from said settling chamber.

4. An apparatus for the continuous fermentation of liquids comprising a vessel provided with a plurality of chambers constituting ascension chambers through which fermentation liquid travels in an ascending path and a plurality of chambers alternately disposed between said ascension chambers constituting descension chambers through which fermentation liquid travels in a descending path, means connecting said ascension and descension chambers at the top and bottom thereof to provide a multiple circulatory system so that the liquid will travel alternately in an ascending and descending path to permit uninterrupted progressive consumption of the nutrient substance, the means connecting the ascension and descension chambers at the top thereof being adjustable to regulate the flow of the liquid, said vessel being provided with a settling chamber through which the liquid travels in an ascending path, means to supply fermentation liquid containing micro-organisms to the first ascension chamber, means cooperating with each of said ascension chambers to suspend the micro-organisms in said fermentation liquid, means in the lower portion of the vessel connecting the last descension chamber and settling chamber with the first ascension chamber whereby a part of the micro-organisms is automatically returned to the first ascension chamber, and means to withdraw consumed nutrient solution from said settling chamber.

5. An apparatus for the continuous fermentation of liquids comprising a vessel provided with a plurality of chambers constituting ascension chambers through which fermentation liquid travels in an ascending path and a plurality of chambers alternately disposed between said ascension chambers constituting descension chambers through which fermentation liquid travels in a descending path, means connecting said ascension and descension chambers to provide a multiple circulatory system so that the liquid will travel alternately in an ascending and descending path to permit uninterrupted progressive consumption of the nutrient substance, said ascension and descension chambers being spaced from the bottom of said vessel, said vessel being also provided with a settling chamber through which the liquid travels in an ascending path, means to supply fermentation liquid containing micro-organisms to the first ascension chamber, means cooperating with each of said ascension chambers to suspend the micro-organisms in said fermentation liquid, and means in the lower portion of the vessel connecting the last descension chamber and settling chamber with the first ascension chamber, said means also connecting with said ascension and descension chambers.

6. An apparatus for the continuous fermentation of solution comprising a vessel provided with a plurality of chambers constituting ascension chambers through which fermentation liquid travels in an ascending path and a plurality of chambers alternately disposed between said ascension chambers constituting descension chambers through which fermentation liquid travels in a descending path, said vessel also being provided adjacent the last descending chamber with a settling chamber through which the liquid travels in an ascending path, a canal located at the bottom of the vessel and leading from the settling chamber to the first ascension chamber, each ascension chamber having an opening at the top thereof to connect the respective ascension chamber to the descension chamber next in advance thereof, each ascension chamber having an opening adjacent the bottom thereof to connect the respective ascension chamber to the next preceding descension chamber, the openings adjacent the bottom of said ascension chambers being connected to said canal, and the settling chamber being connected at the bottom thereof to the next preceding descension chamber.

7. An apparatus for the continuous fermentation of solution comprising a vessel provided with a plurality of chambers constituting ascension chambers through which fermentation liquid travels in an ascending path and a plurality of chambers alternately disposed between said ascension chambers constituting descension chambers through which fermentation liquid travels in a descending path, means cooperating with each ascension chamber to impart ascending movement to the fermentation solution, said vessel also being provided adjacent the last descending chamber with a settling chamber through which the liquid travels in an ascending path, a canal located at the bottom of the vessel and leading from the settling chamber to the first ascension chamber, each ascension chamber having an opening at the top thereof to connect the respective ascension chamber to the descension chamber next in advance thereof, each ascension chamber having an opening adjacent the bottom thereof to connect the respective ascension chamber to the next preceding descension chamber, the openings adjacent the bottom of said ascension chambers being connected to said canal, and the settling chamber being connected at the bottom thereof to the next preceding descension chamber.

8. An apparatus for the continuous fermentation of solution comprising a vessel provided with a plurality of chambers constituting ascension chambers through which fermentation liquid travels in an ascending path and a plurality of chambers alternately disposed between said ascension chambers constituting descension chambers through which fermentation liquid travels in a descending path, means cooperating with each ascension chamber to impart ascending movement to the fermentation solution, said vessel also being provided adjacent the last descending chamber with a settling chamber through which the liquid travels in an ascending path, a canal located at the bottom of the vessel and leading from the settling chamber to the first ascension chamber, each ascension chamber having an opening at the top thereof to connect the respective ascension chamber to the descension chamber next in advance thereof, each ascension chamber having an opening adjacent the bottom thereof to connect the respective ascension chamber to the next preceding descension chamber, the openings adjacent the bottom of said ascension chambers being connected to said canal, the settling chamber being connected at the bottom thereof to the next preceding descension chamber, means for feeding fresh fermentation liquid to the first ascension chamber, means for drawing off the spent liquid from the upper part of the settling chamber, and means for drawing off liquid rich in micro-organisms.

9. A method of continuously fermenting nutrient solutions comprising circulating said nutrient solution in an alternating ascending and descending path, stirring said solution to maintain the microorganisms in suspension in said nutrient solution until the latter is fermented, conducting the resultant nutrient solution and microorganisms suspended therein in an ascending path, settling at least a portion of the microorganisms in the said last named ascending path, supplying at least a portion of the settled microorganisms and a portion of the consumed nutrient solution with fresh nutrient solution to the initial ascending path, and continuously removing the remaining part of the consumed nutrient solution with a reduced content of microorganisms.

10. A process of continuously cultivating yeast comprising circulating a nutrient solution in an alternate ascending and descending path, aerating said solution to maintain the yeast in suspension in the nutrient solution until the latter is fermented, conducting the nutrient solution and yeast suspended therein in an ascending path, settling at least a portion of the yeast in the said last ascending path, supplying at least a portion of the settled yeast and a portion of the consumed nutrient solution with fresh nutrient solution to the initial ascending path and continuously removing the remaining part of the consumed nutrient solution with a reduced content of yeast.

11. A process for the continuous fermentation of nutrient solutions comprising circulating a nutrient solution containing microorganisms suspended therein in an alternate ascending and descending path with continuous progressive consumption of the nutrient, aerating the solution in only the ascending portion of the path succeeded by a descending portion of the path to maintain the microorganisms in suspension therein until the solution is fermented, dividing said solution in the last ascending portion of the path into a sub-division rich in microorganisms and into a sub-division poor in microorganisms, conducting by the effect of gravity a portion of the sub-division rich in microorganisms to the beginning of the path of travel of entering fresh nutrient solution in such a manner that some of said portion is admixed with some of the nutrient solution at the lower reversing points of the path and carried through the remainder of said path and drawing off the liquid poor in microorganisms from the upper part of the last ascending portion of the path.

HEINRICH SCHOLLER.
MAX SEIDEL.